UNITED STATES PATENT OFFICE.

ALFRED J. M. LASCHÉ, OF MILWAUKEE, WISCONSIN.

MASHING PROCESS.

977,200. Specification of Letters Patent. Patented Nov. 29, 1910.

No Drawing. Application filed March 9, 1908. Serial No. 420,081.

*To all whom it may concern:*

Be it known that I, ALFRED J. M. LASCHÉ, residing in Milwaukee, in the county of Milwaukee and State of Wisconsin, have invented new and useful Improvements in Mashing Processes, of which the following is a description.

My invention has relation to improvements in mashing processes.

In the usual method employed in the manufacture of alcohols, malt is ordinarily used for the purpose of converting the starch of the grain in the preparation of the mash. Also, other methods have been devised wherein the mold or saccharifying organism is permitted to develop in the grain or starch mash which has previously been boiled and then cooled to a desired temperature. Under such methods as last stated, the organism or mold grows in the mash by producing filaments throughout the entire mass, thereby effecting the saccharification or conversion of the starch into fermentable sugar. In these processes, therefore, a living organism, applied directly to the mash, is necessary as a converting factor. In other words, in the methods other than those in which malt is used to produce the conversion, the mold is applied directly to the mash, and thereby a certain chemical action takes place which converts the starch into sugar, by reason of the mold permeating through the body of the mash and secreting an enzym therein.

It is the object of the present invention to provide an improved method by which a substance other than malt, and which substance has been previously infected by a micro organism allowed to propagate therein under the most favorable circumstances for a required length of time, and then removed therefrom is employed in place of malt to convert the starch of the grain in the preparation of the mash. I prefer to employ a micro organism which belongs to a class known in mycology as molds. The following molds have been found by experience to produce the desired results, viz: aspergillus, amylomyces, and mucorinæ.

The first step in the preferred manner of carrying out the method, is to take distillery slop, and under which term I would include spent beer, or pot ale (which is dealcoholized fermented distillers' mash) or spent water of brewery or vinegar grains, and sterilize the slop, and neutralize the acid therein, if necessary, the latter being accomplished by the addition of lime or other substance which can be used for such purposes. As a rule, the addition of a small quantity of lime is desirable so that the amount of lactic acid, which is excessive and detrimental in carrying out the purpose, will be neutralized. The addition of lime causes a coagulation which creates a very rapid settling of the particles held in suspension, and a precipitation of the phosphates and the like. Only a short time is necessary for the suspended particles to settle, when the clear liquid which is used for the purpose can be drawn off. The sedimentary deposit obtained by this process will be found to be larger in amount than is obtained otherwise.

After the liquid has been prepared as above, it is infected with a micro organism which has the property of secreting liquefying and saccharifying enzyms, the organism being preferably one which belongs to a class known in mycology as "molds," and comprehending aspergillus, amylomyces, and mucorinæ. It is desirable that the organism be added in the form of a pure culture, and it is permitted to propagate under most favorable conditions for a desired length of time. During the time the organism is growing in the liquid, it gives to said liquid the property of converting starch into fermentable sugar. Micro organisms or molds in developing produce this chemical substance, or produce this substance as a product of decomposition which becomes diffused throughout the entire liquid. This liquid which, under my improved method, is drawn off and used in place of malt to convert the starch of the grain in the preparation of the mash, does not of necessity contain any living organism whatever, that is to say, no living organism takes part in the conversion of the starch during the mashing operation.

The next step is to remove the liquid free from the micro organism, or from the mold, or in other words, to drain the liquid entirely clear of or free from the organism, or of the mold, and said liquid is then ready to be applied for the mashing process, that is to say, the grain mash is then treated with this liquid in order to convert the starch of the grain into sugar. The mash is now ready for fermentation, and after fermentation is completed, the mash so treated is ready for distillation.

Processes which have heretofore been devised and which do not employ malt for securing the conversion, consist in permitting the mold or saccharifying organism to develop in the grain or starch mash which has previously been boiled and then cooled to a desired temperature, and, as before stated, the organism or mold grows in this mash by producing filaments throughout the entire mass, and thereby effects the saccharification or conversion of starch into fermentable sugar. In these processes, therefore, the living organism is necessary as a converting factor, and in this respect the old processes are entirely different from the improved process herein shown and claimed.

While I prefer, in carrying out my method, to allow for precipitation or settling of the particles and then draining off the clear liquid, and treating this clear liquid with the micro organism, or with the mold, from which it is subsequently separated, yet I do not wish to be understood as restricting myself thereto, inasmuch as the method may be carried out by applying the micro organism or mold directly to the slop, or spent beer, or pot ale, or spent water of brewery or vinegar grains, and applying the substance so infected, after it has been separated from the micro organism or mold, directly to the mash, without first draining the liquid from the heavy particles, and infecting the liquid with the micro organism or mold, as in the preferred manner of carrying out the method, and I therefore wish to be understood as considering such deviation to be within the spirit and scope of my invention.

As heretofore stated, the usual process of converting grain mash consists in the use of 10% to 20% of malted cereal by means of which dissolved starch will convert into fermentable substance from which alcohol is produced by a process of fermentation.

The principal advantage of the herein described method over this usual method is the great difference in the cost of material which is used in the preparation of the mash. According to my improved method, malt is entirely dispensed with in the preparation of the mash. The expense attached to the preparation of the spent beer or slop by developing the liquefying and inverting enzymes therein is so small that it does not enter into consideration.

As to the other known processes wherein malt is not used, the operating expenses thereof are practically as high as in the more usual process where malt is used, and also in some of said other processes very expensive apparatus is absolutely necessary.

Another important advantage of my method resides in the fact that the fermenting period in the distillery is exactly the same as according to the usual method of operation which is designed to comply with the regulations of the U. S. Department of Internal Revenue.

Another advantage of my method of sufficient importance to receive mention is that the liquid which is employed to cause the inversion of the starch of the grain and which liquid contain the liquefying and inverting enzyms, is entirely or practically free from detrimental contamination of bacteria, whereas according to other processes the grain mash also becomes contaminated with objectionable bacteria and frequently this contamination is very great and causes much loss in the amount of the yield of alcohol produced.

What I claim as my invention is:

1. The herein described method, consisting in taking liquid distillery slop, and infecting the same with a micro organism possessing the property of secreting liquefying and saccharifying enzyms, permitting the organism to propagate in the slop, for a desired length of time, and finally separating the substance so treated from the organism.

2. The herein described method, consisting in taking liquid distillery slop, and infecting the same with a micro organism possessing the property of secreting liquefying and saccharifying enzyms, permitting the organism to propagate in the slop, for a desired length of time, separating the substance so treated from the organism, and finally applying the substance so separated to the grain mash.

3. The herein described method, consisting in permitting the suspended particles of distillery slop to settle, draining the clear liquid from the sediment, infecting the drained liquid with a micro organism possessing the property of secreting liquefying and saccharifying enzyms, permitting the organism to propagate in the liquid for a desired length of time, and finally draining the liquid clear or free from the organism.

4. The herein described method, consisting in sterilizing and neutralizing distillery slop, infecting the same with a micro organism possessing the property of secreting liquefying and saccharifying enzyms, permitting the organism to propagate therein for a desired length of time, and finally separating the substance so treated from the organism.

5. The herein described method, consisting in taking liquid distillery slop, and infecting the same with an organism known as mold in the form of pure culture, permitting the organism to propagate in the slop, for a desired length of time, and finally separating the substance so treated from the organism.

6. The herein described method, consisting in sterilizing distillery slop and neutralizing the acid therein, by the addition thereto of a small quantity of lime, and thereby causing the precipitation of suspended particles, draining the clear liquid from the sediment, infecting the drained liquid with a micro organism possessing the property of secreting liquefying and saccharifying enzyms, permitting the organism to propagate in the liquid for a desired length of time, and finally draining the liquid clear of or free from the organism.

7. The herein described method, consisting in permitting the suspended particles of distillery slop to settle, draining the clear liquid from the sediment, infecting the drained liquid with an organism known as mold, permitting the mold to propagate in the liquid for a desired length of time, draining the liquid clear of or free from the mold, and finally treating the grain mash with said drained liquid.

In testimony whereof, I affix my signature, in presence of two witnesses.

ALFRED J. M. LASCHÉ.

Witnesses:
A. L. MORSELL,
ALENA A. KLUG.